United States Patent [19]

Randall

[11] 4,145,383
[45] Mar. 20, 1979

[54] SLURRY AERATION METHOD AND APPARATUS

[75] Inventor: Bryce E. Randall, Edmunds, England

[73] Assignee: Howard Machinery Limited, Edmunds, England

[21] Appl. No.: 861,440

[22] Filed: Dec. 15, 1977

Related U.S. Application Data

[63] Continuation of Ser. No. 719,454, Sep. 1, 1976, abandoned.

[51] Int. Cl.² .............................................. C02C 1/18
[52] U.S. Cl. ........................................ 261/29; 261/30; 261/36 R; 261/91; 261/93; 415/72
[58] Field of Search ................................. 261/29-30, 261/36 R, 84, 91, 93; 210/150, 169, 242 A; 366/102, 266; 415/72, 116

[56] References Cited

U.S. PATENT DOCUMENTS

| | | | |
|---|---|---|---|
| 1,417,895 | 5/1922 | Fahrenwald | 261/87 |
| 2,184,496 | 12/1939 | Hale | 415/72 |
| 2,271,446 | 1/1942 | Unger, Jr. | 261/93 |
| 2,530,814 | 11/1950 | De Becze et al. | 261/93 |
| 3,053,390 | 8/1962 | Wood | 261/93 |
| 3,064,879 | 11/1962 | Carlson | 415/72 |
| 3,204,861 | 8/1965 | Brown | 261/93 |
| 3,620,512 | 11/1971 | Muskat et al. | 261/91 |
| 3,722,679 | 3/1973 | Logue | 261/DIG. 75 |
| 3,796,414 | 3/1974 | Winton | 210/219 |
| 3,807,708 | 4/1974 | Jones | 261/93 |
| 3,940,461 | 2/1976 | Martin et al. | 261/91 |

FOREIGN PATENT DOCUMENTS

| | | | |
|---|---|---|---|
| 566270 | 9/1975 | Switzerland | 210/176 |
| 1027514 | 4/1966 | United Kingdom | 261/91 |
| 1173254 | 12/1969 | United Kingdom | 261/91 |

*Primary Examiner*—Tim R. Miles
*Assistant Examiner*—Jon E. Hokanson
*Attorney, Agent, or Firm*—Wegner, Stellman, McCord, Wiles & Wood

[57] ABSTRACT

A method of aerating slurry involves the use of a screw conveyor operating in a tubular casing having an inlet and an outlet. The inlet has access to the air above the level of the slurry so that as the conveyor is rotated air is admitted through the inlet and discharged at the outlet, which is below the surface level, into the body of the slurry. The screw conveyor may be in two portions of opposite hand so that one portion discharges air and the other portion discharges slurry at a common outlet intermediate the two ends of the casing.

12 Claims, 4 Drawing Figures

SLURRY AERATION METHOD AND APPARATUS

CROSS-REFERENCE TO RELATED APPLICATION

This application is a continuation of my copending application Ser. No. 719,454, filed Sept. 1, 1976, now abandoned.

BACKGROUND OF THE INVENTION

This invention relates to a method and apparatus for slurry aeration and particularly, but not exclusively, to mixing and aerating farm slurry or like liquids.

On farms slurry effluents are often stored in containers for distribution over the ground or for discharge; but the effluents in the containers give rise to unpleasant smells and production of obnoxious waste products. An improvement in the condition of the effluent can be obtained by aerating and mixing the effluents in the containers but existing apparatus is not satisfactory for this purpose because of the relatively high viscosity of farm effluents. The effluents can be diluted with water to decrease the viscosity but this requires that larger containers be provided for the diluted material.

SUMMARY OF THE INVENTION

An object of the invention is to provide a slurry aeration method and apparatus which is capable of acting on liquids having relatively high viscosities and of introducing air into the material so as to promote aerobic conditions in the liquid.

According to one aspect the invention provides a method of slurry aeration in which a screw conveyor located in a tubular casing having inlet and outlet means is placed in slurry to be aerated so that the inlet means is accessible to air and the outlet means is immersed in the slurry, and the screw conveyor is rotated to admit air through the inlet and discharge the air through the outlet into the slurry to thereby aerate the slurry.

According to another aspect the invention provides slurry aeration apparatus comprising a screw conveyor located in a tubular casing having inlet and outlet means, when used according to the method of the invention.

Conveniently the screw conveyor is in two portions, one portion having a screw of opposite hand to the other portion, and the tubular casing has an opening serving as said inlet or outlet means adjacent the junction of the two portions. Other inlet or outlet means may be formed as openings at opposite ends of the casing and adjacent the ends of the screw conveyor portions remote from said junction. Such an arrangement enables air to be admitted into the casing from the air inlet means, which is above the liquid surface level, to be discharged into the liquid.

Alternatively the screw conveyor has a screw of only one hand and inlet and outlet means are at opposite ends of the tubular casing.

According to further preferred features of the invention the apparatus is supported in a liquid container on a boom, the boom and/or the apparatus being movable relative to the container so that the apparatus can be located in different parts of the container.

Moreover, the torque reaction on the drive means for the screw conveyor and the reaction on the apparatus due to the discharge of liquid can be utilized for moving the boom or for moving the apparatus on the boom.

Further preferred features of the invention appear from the following description of two embodiments of the invention given by way of example only and with reference to the accompanying drawings in which:

THE DRAWINGS

DETAILED DESCRIPTION OF THE INVENTION

Figure 1:
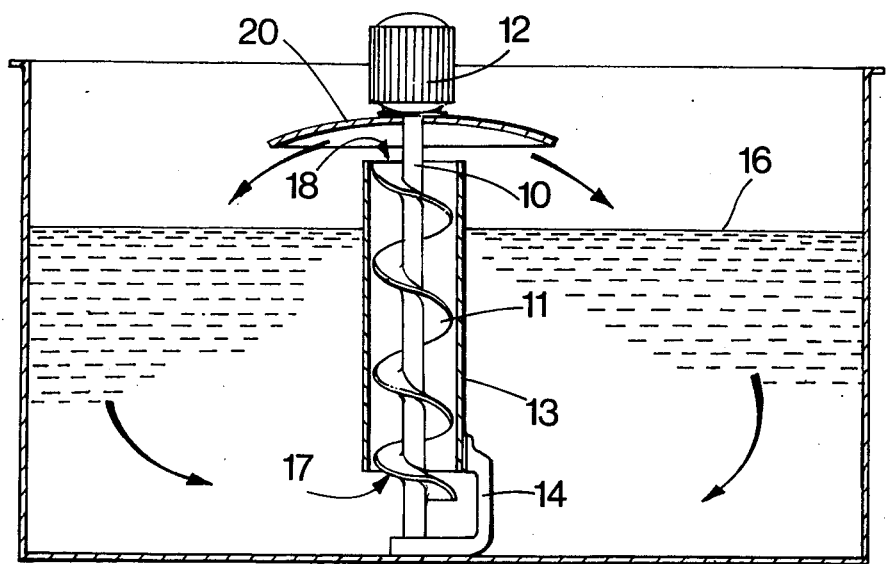
FIG. 1 is a schematic sectional side elevation of one form of slurry aeration apparatus.
Figure 2:
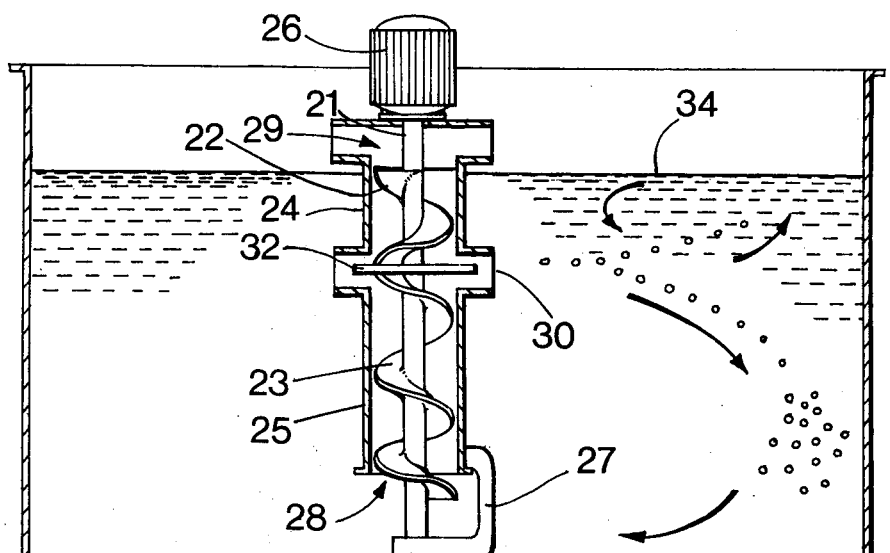
FIG. 2 is a schematic side elevation of a second form of slurry aeration apparatus, in cross section.

For clarity of illustration, FIGS. 1 and 2 show the apparatus as though the casing did not fill with slurry when it is immersed. In fact, of course, the immersed portion of the casing is filled with slurry through the open lower end.

Referring to the drawings and firstly to FIG. 1, slurry aeration apparatus comprises a rotatable shaft 10 about which is located a spiral screw conveying member 11. The shaft 10 is arranged to be driven by a motor 12 the direction of rotation of which can be reversed. The screw member 11 is surrounded by a tubular casing 13 which is clearly shown in FIG. 1 to be slightly spaced radially from the periphery of said member, and the lower end of the shaft 10 is supported in the bearings (not shown) carried on an arm 14 secured to the casing 13.

The apparatus is located in a liquid container 15 and slurry in the container has a surface level 16. At the lower end of the casing 13 is formed an opening 17 which serves as an inlet or an outlet opening depending on the direction in which the shaft 10 is rotated. At the upper end of the casing an opening 18 is formed which also serves as an inlet or outlet opening according to the direction of rotation of the shaft 10. In an air injection mode of operation the opening 18 is an air inlet while the opening 17 is a slurry and air outlet; while in a slurry mixing mode the opening 17 is a slurry inlet while the opening 18 is a slurry outlet.

A deflector plate 20 of generally concave, disc-like shape can be located above the opening 18 and the plate 20 serves to deflect the liquid radially and towards the slurry surface 16 in the slurry mixing mode. In this way the slurry in the container is mixed and also is split up into particles which are exposed to the air, thereby increasing the oxygen content and promoting an aerobic condition in the slurry.

The apparatus of FIG. 1 is operated in its air injection mode with the shaft rotating in a direction such that the slurry in the casing is discharged through the opening 17 and air is drawn into the upper end of the casing 13 through the opening 18 to extend down to the opening 17 and to be there discharged into the slurry through the opening 17. During this action, slurry remains in the casing 13 in the form of a vortex against the inner wall of the casing. This mode of operation can be alternated with the mixing mode in which slurry is discharged against the plate 20.

As a modification of the arrangement of FIG. 1, the deflector plate 20 may be of greater curvature and the radially outer edges may be a small distance below the slurry surface level 16. This arrangement promotes enhanced aeration of the slurry and a venturi effect may be produced at the outer edges of the plate 20 which causes air to be drawn down into the slurry by the movement of slurry over the lower surface of the plate when the apparatus is operating in the mixing mode to pump slurry upwardly and out through the opening 18.

Referring now to FIG. 2, slurry aeration apparatus comprises a shaft 21 having screw conveying portions 22 and 23 located about the shaft, the portion 22 being of opposite hand to the portion 23. A tubular casing is in two portions 24 and 25, the casing portion 24 surrounding the conveying portion 22 in slightly spaced relationship to the periphery thereof, and the portion 25 surrounding the conveying portion 23 in slightly spaced relationship to the periphery of said portion 23.

The shaft 21 is driven by a motor 26, the direction of drive of which can be reversed, and the lower end of the shaft 21 is supported in bearings (not shown) carried on an arm 27 secured to the casing portion 25.

An opening 28 is formed at the lower end of the casing portion 25, and an opening 29 is formed at the upper end of the casing portion 24. Intermediate the casing portions 24 and 25 an opening 30 is formed and a baffle disc 32 is located about the shaft 21 at the junction between the conveying portions 22 and 23. The apparatus is mounted in a slurry container 33 with the lower edge of the opening 29 above a slurry surface level 34.

In an air injection mode, the FIG. 2 apparatus is operated by rotating the shaft 21 so that the screw portion 23 creates a slurry vortex in the casing portion 24 and draws air downwardly through said casing portion for discharge through the opening 30. At the time, the screw portion 23 acts to move slurry upwardly in the casing portion 25, thus drawing slurry through the bottom opening 28 and discharging it through the intermediate opening 30 with the air that is drawn in by the screw portion 22. The baffle disc 32 constrains the air and slurry to be discharged radially of the shaft 21. This mode of operation causes a downward flow of slurry in the container from the opening 30 which tends to counteract the natural upward movement of air bubbles entrained in the slurry. The depth to which the conveying member will admit air is dependent on several factors including the characteristics of the conveying members and the speed of rotation.

The casing portions 24 and 25 are interconnected by structural members (not shown) but these members are arranged so as not to impede the radial flow of slurry and air through the whole circumference of the opening 30.

As an alternative mode of operation, the slurry surface level may be below the level of the opening 30, and the shaft 21 is rotated in a reverse direction so that slurry in the casing portion 25 is discharged through the opening 28 and air enters into the casing portion 25 through the opening 30 to be discharged into the slurry through the opening 28. This mode of operation is equivalent to the use of the lower portion of this apparatus in the air injection mode of the FIG. 1 embodiment and this operation can be alternated with a slurry mixing mode in which the direction of rotation of the shaft is reversed.

In both the FIG. 1 and FIG. 2 embodiments, the action of the screw conveyor, when admitting air and discharging this air into the slurry, is initially to pump out slurry from the casing portion between the inlet and outlet to thereby create a void which is filled with air except for a vortex of slurry which remains as a layer of slurry against the inner wall of the casing and which extends up the casing from the outlet. The vortex is necessarily created because, as heretofore stated and as clearly seen in FIGS. 1 and 2, the screws do not touch the casing, and thus are incapable of driving all the slurry out the bottom opening 17 of the FIG. 1 embodiment or out of the casing portion 24 through the intermediate discharge opening 30 of the FIG. 2 embodiment. In each case the lower end of the vortex is located at the level of the outlet so that the column of air filling the center of the vortex reaches down to the level of the outlet, and air bubbles are sheared off from the lower end of the column of air and are discharged through the outlet into the body of the slurry. In the FIG. 2 embodiment the discharge of the air bubbles is assisted by the pumping of slurry effected by the conveying portion 23.

The detailed construction elements of the screw conveyor of both embodiments may be similar to those already employed in screw conveyor or auger pumps for slurry but the conveyor may be of smaller dimensions because of the reduced pumping capacity required. It is considered that such screw conveyors could be utilized to discharge air up to a depth of 7 to 8 meters below the slurry surface and at a relatively low power requirement.

Figure 3:
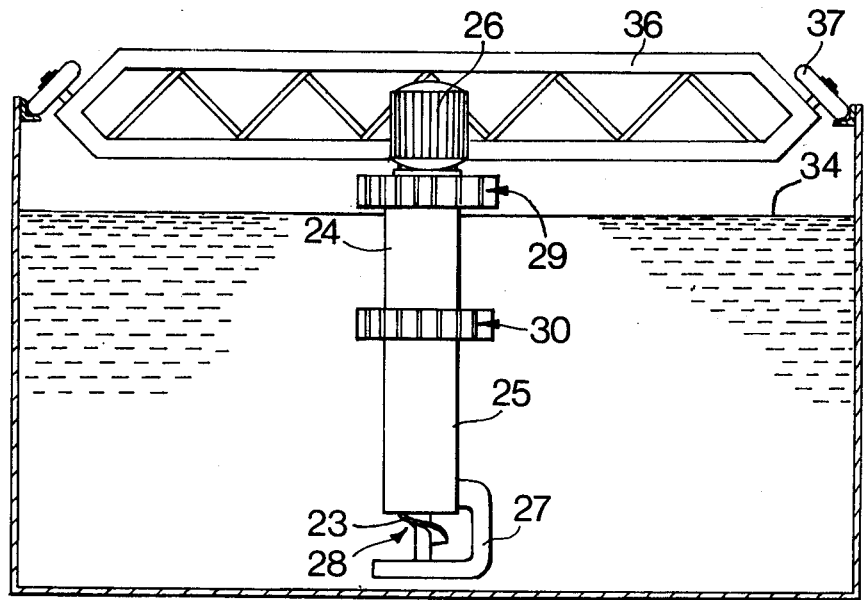
FIG. 3 is a schematic side elevation of the appparatus of FIG. 2 supported on a boom in a liquid container.

Referring now to FIG. 3, the slurry aeration apparatus of FIG. 2 can be mounted on a beam 36 supported at each end on the upper edges of a rectangular slurry container 33 by wheels 37 so that the beam 36 can be moved with respect to the container to change the position of the apparatus in the container. In addition, the apparatus may be carried on the beam 36 by a carriage (see FIG. 4) which can be moved along the beam. Similarly the apparatus of FIG. 1 can be supported in the container to change the position of the apparatus in the container. For each form of the apparatus the torque reaction of the motor may be used to move the apparatus around the container.

Figure 4:
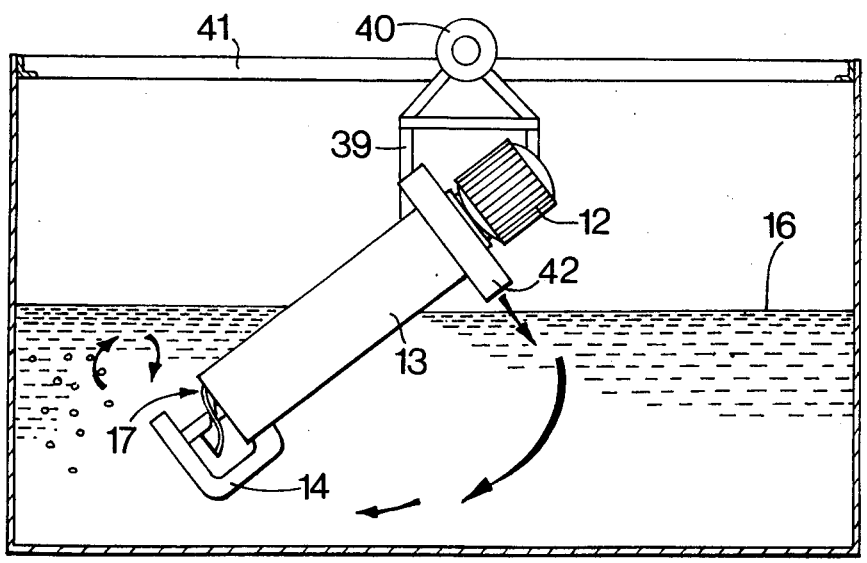
FIG. 4 is a schematic side elevation of slurry aeration apparatus supported for movement about a liquid container.

Referring now to FIG. 4, the slurry aeration apparatus is supported in the container 15 by means of a carriage 39 mounted by means of wheels 40 on a beam 41 extending across the top of a circular or rectangular container. The carriage 39 is free to move along the beam 41 and the apparatus is arranged so that the reaction on the apparatus due to discharge of slurry from the apparatus is used to propel the apparatus along the beam 41. Thus if the direction of rotation of the shaft is periodically reversed, the apparatus will be moved back and forth from one side to the other of the container. In order that this may be achieved the axis of rotation of the shaft is inclined to the vertical and the slurry discharge outlet 42 is directed to one side of the apparatus.

It has been found that to achieve movement of air into the slurry, the conveying members may be rotated at speeds between 250 and 2000 r.p.m. depending on the nature of the slurry being pumped and the characteristics of the apparatus.

It is envisaged that the apparatus of the invention will find particular application in mixing and aerating undiluted farm slurry but it may find application with other liquids at, for example, sewage works. In such circumstances, the apparatus promotes aerobic conditions in the liquid and prevents the accumulation of the products of anaerobic conditions. It may also assist in the aerobic breakdown of waste material.

These operational characteristics may be assisted by the ability of the apparatus to promote the mixing of small air bubbles in the liquid which give increased surface area between the air and the liquid and a longer period in which the bubbles remain suspended in the liquid. The latter feature is also improved by inducing the liquid to flow downwardly with the entrained air bubbles, as in the FIG. 2 apparatus.

The foregoing detailed description is given for clearness of understanding only and no unnecessary limitations should be understood therefrom as modifications will be obvious to those skilled in the art.

I claim:

1. A method of aerating slurry comprising the steps of providing aeration apparatus including a tubular casing and a screw conveyor in said tubular casing which has its periphery spaced inwardly from the casing, said casing having open upper inlet means and open lower outlet means;

immersing said aeration apparatus in a body of slurry so that the lower outlet means is below the surface level and the slurry fills the casing to said surface level and so that the inlet means is accessible to air above the surface level;

and thereafter rotating the screw conveyor in a direction to pump slurry in the casing down through the outlet means so that air enters the casing through the inlet means to extend down to the level of the outlet means and is discharged from the outlet means into the body of slurry, with slurry remaining in the casing to form a vortex against the inner wall of the casing.

2. The method of claim 1 in which the aeration apparatus is moved laterally about in the body of slurry during aeration.

3. A method of aerating slurry comprising the steps of:

providing aeration apparatus including a tubular casing and a screw conveyor which has upper and lower portions of opposite hand the periphery of which are spaced inwardly from the casing, said tubular casing having open upper and open lower inlet means and having open outlet means intermediate the upper and lower inlet means and adjacent the junction of the upper and lower conveyor portions;

immersing said aeration apparatus in a body of slurry so that the lower inlet means and the outlet means are below the surface level and the slurry fills the casing to said surface level and so that the upper inlet means is accessible to air above the surface level;

and thereafter rotating the screw conveyor in a direction to cause said lower portion of the screw conveyor to pump slurry up from said lower inlet means to said outlet means and to cause said upper portion of the screw conveyor to pump slurry in the casing above said outlet means down through said outlet means so that air enters the casing through said upper inlet means to extend down to the level of the outlet means and is discharged from the outlet means into the body of slurry, slurry remaining in the casing above the outlet means and forming a vortex against the inner wall of the casing.

4. The method of claim 3 in which the aeration apparatus is moved laterally about in the body of slurry during aeration.

5. Apparatus for aerating slurry in a container which is filled with slurry to a predetermined surface level, said apparatus comprising, in combination:

a screw conveyor including a rotatable shaft and a spiral screw member mounted on said shaft;

a tubular casing encircling the screw conveyor and spaced slightly from the periphery thereof;

open upper inlet means at the top of the casing and open lower outlet means in the casing below said inlet means;

means supporting the apparatus in the container with the open lower outlet means below the surface level of the slurry in the container and the open upper inlet means above said level so that slurry fills the casing to said level;

and selectively operable drive means connected to rotate the screw conveyor in a direction to move slurry in the casing downwardly to leave a vortex of slurry against the inner surface of the casing while discharging some of the slurry in the casing through said open lower outlet and drawing air through said open upper inlet and discharging it through said open lower outlet.

6. The apparatus of claim 5 in which the drive means may rotate the screw conveyor in the direction defined in claim 5, or selectively in the opposite direction to circulate slurry upwardly through the casing, whereby the apparatus may be operated alternately in an aerating mode and in a mixing mode.

7. Apparatus for aerating slurry in a container which is filled with slurry to a predetermined surface level said apparatus comprising, in combination:

a screw conveyor including a rotatable shaft and a spiral screw member mounted on said shaft, said screw member having upper and lower portions of opposite hand which terminate substantially in a common transverse plane;

a tubular casing encircling the screw conveyor and spaced slightly from the periphery thereof;

open upper inlet means and open lower inlet means in the casing;

open outlet means in the casing intermediate the upper and lower inlet means, said outlet means occupying a vertical space which includes said common transverse plane;

means supporting the apparatus in the container with the lower inlet means and the outlet means below the surface level of the slurry in the container and with the open upper inlet means above said level so that slurry fills the casing to said level;

and selectively operable drive means connected to rotate the screw conveyor in a direction causing said lower portion of the screw member to pump slurry through the lower inlet means to the outlet means and causing the upper portion of the screw member to form a vortex of slurry against the inner surface of the casing and draw air into the casing through the upper inlet means and discharge it through the open outlet means with the discharging slurry.

8. The apparatus of claim 7 which includes a baffle disc on the shaft in said common transverse plane, said baffle disc constraining air and slurry to be discharged laterally through the open outlet means.

9. Apparatus for aerating slurry, said apparatus comprising, in combination;

a container which is filled with slurry to a predetermined surface level;

a beam mounted on and extending across the container;

a screw conveyor including a rotatable shaft and a spiral screw member mounted on said shaft;

a tubular casing encircling the screw conveyor and spaced slightly from the periphery thereof;

means mounting the screw conveyor and the casing on the beam with the open lower outlet means below the surface level of the slurry in the container and the open upper inlet means above said level so that slurry fills the casing to said level;

means for moving the screw conveyor and the casing to different parts of the container;

open upper inlet means at the top of the casing and open lower outlet means in the casing below said inlet means;

and selectively operable drive means connected to rotate the screw conveyor in a direction to move slurry in the casing downwardly to leave a vortex of slurry against the inner surface of the casing while discharging some of the slurry in the casing through said open lower outlet and drawing air through said open upper inlet and discharging it through said open lower outlet.

10. The apparatus of claim 9 in which the means for moving the screw conveyor and the casing comprises means for moving the beam on the container.

11. The apparatus of claim 9 in which the means for moving the screw conveyor and the casing comprises means for moving the screw conveyor and casing on the beam.

12. The apparatus of claim 9 in which the selectively operable drive means may be rotated in either direction, and provides means for moving the conveyor and casing back and forth in the container.

* * * * *